(No Model.)

O. OHLSSON.
CENTRIFUGAL CREAMER.

No. 530,447. Patented Dec. 4, 1894.

Witnesses
W. B. Carrabrants
H. W. Atwater

Inventor:
Olof Ohlsson,
By Drake & Co. Atty's.

UNITED STATES PATENT OFFICE.

OLOF OHLSSON, OF NEWARK, NEW JERSEY, ASSIGNOR TO THE UNITED STATES BUTTER EXTRACTOR COMPANY, OF NEW JERSEY.

CENTRIFUGAL CREAMER.

SPECIFICATION forming part of Letters Patent No. 530,447, dated December 4, 1894.

Application filed June 22, 1893. Serial No. 478,539. (No model.)

*To all whom it may concern:*

Be it known that I, OLOF OHLSSON, a subject of the King of Sweden, residing at Newark, in the county of Essex and State of New Jersey, have invented certain new and useful Improvements in Centrifugal Creamers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of cream separating machines shown in my contemporaneous application, filed in the United States Patent Office January 21, 1893, Serial No. 459,132, which has become Patent No. 519,070, dated May 1, 1894, the objects of the invention being to reduce the cost of construction, reduce the number of parts to prevent dirt from clogging the passages, and to secure other advantages and results some of which will be referred to in connection with the description of the working parts.

The invention consists in the improved centrifugal cream separator and in the arrangements and combinations of parts, substantially as will be hereinafter set forth and finally embodied in the claims.

Figure 1:
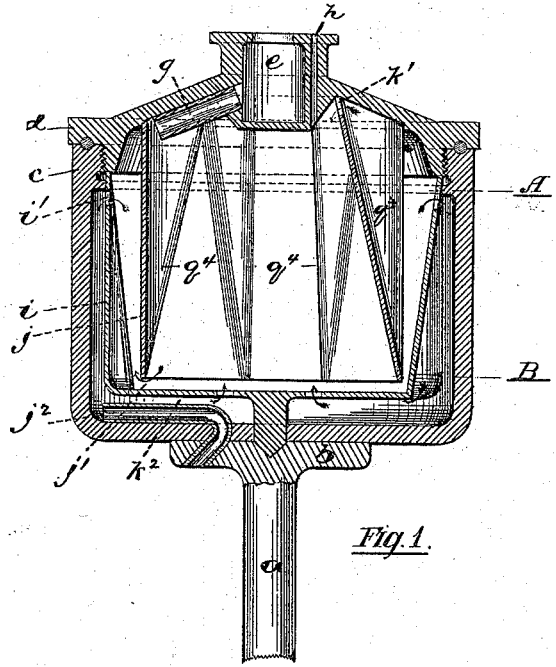
Figure 2:
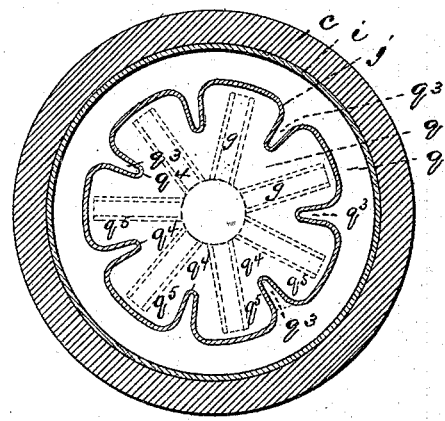
Figure 3:
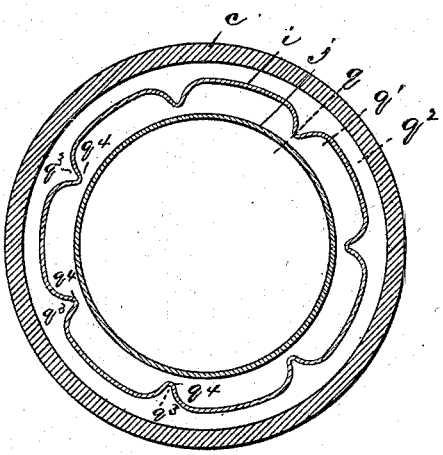

Referring to the accompanying drawings, in which like letters indicate corresponding parts in each of the several views, Figure 1 is a central vertical section of the separating bowl and its contents. Fig. 2 is a section of the same taken on line A, and Fig. 3 is a section taken on line B.

In said drawings, $a$ indicates a rotary shaft having suitable bearings and rotating means, not shown. At the upper end of the said shaft is formed a seat, $b$, to receive the bowl, $c$, which latter is preferably of cast iron or steel. Said bowl is of any suitable arrangement and construction, and is provided with a cover, $d$, having a receptacle, $e$, for the milk and a tube or duct, $g$, extending from said receptacle to a point in the main separating chamber about midway between the center thereof and the periphery of the bowl where it delivers the milk or fluid to be separated. I may employ a single duct, $g$, or a plurality. I prefer to employ one for every recess, $q^5$, formed between certain wings, as indicated in outline in Fig. 2, and as will hereinafter be more fully described. At one side of the receptacle, $e$, the cover is provided with a cream exit opening, $h$, which is stationed in line with the desired cream wall and is intended to communicate in any desirable manner with a cream pan or receptacle, not shown. The main chamber within the bowl is divided by vertical, or approximately vertical, partitions, $i$ and $j$, into a series of compartments $q$, $q'$, $q^2$, which extend from top to bottom of the bowl, or nearly so, the said partitions, each at one end, being open or provided with a passage or duct to allow the fluid to flow from one compartment to the next of the series, the opening, duct or passage being, preferably, either a perforation such as $i'$ or an annular opening such as $j'$, Fig. 1. One of the partitions, $j$ for example is secured to the cover, $d$, and is removable from the bowl therewith. Another, $i$, is supported by the bottom of the bowl or the seat $b$; is of a cup shape, approximating the shape of the bowl, and is held in place by the cover which engages its upper edge. The said partitions, $i$, $j$, are annular in plan, as indicated in Figs. 2 and 3 and are arranged one within the other, a little apart one from the other, to form the compartments above referred to. The bottom of the partition, $i$, is held up from the bottom of the bowl to form a cream passage, $k^2$, between, the said cream passage being continued through the bottom of the said partition which is perforated for that purpose. The inner end of a skim milk outflow tube or duct, $j^2$, may be arranged in said passage, $k^2$, its inward opening lying closely adjacent to the interior of the vertical sides of the bowl. From this point said tube or duct extends to the outside of the bowl in any suitable manner. Said partitions $i$ and $j$ are both preferably corrugated vertically, as indicated, forming cream grooves, $q^3$, on one side of each of said partitions and wings, $q^4$, on the other side, which wings serve the ordinary purpose of imparting rotary movement to the fluid. Being integral with the partitions, said wings are of increased strength and durability, soldering operations, and the seams or joints resulting therefrom are avoided, sharp angles, such as render it difficult to cleanse the parts, are dispensed with, and, the partition, being pressed up from a single metal-plate at one operation, is more simple and inexpensive, all as will be apparent. The grooves, $q^3$, increase in depth toward the cream passages $k'$, $k^2$, the bottoms of said grooves being formed on inclines to lead said cream, when centrifugal force is exerted, toward said passages as will be understood.

The operation of the machine in separating the cream from the skim milk is very similar to that described in the application above referred to. The milk, introduced to the receptacle, $e$, at or near the center of the machine, flows outwardly through the duct or ducts, $g$, into the recesses formed between the wings, $q^4$, of the partition $j$. Here it is given very rapid rotary movement and the lighter cream tends immediately to separate from the heavier components of the milk and to flow inward toward the cream wall and out from the machine through the exit $h$. The heavier skim milk, however, is compelled to traverse the full or nearly full vertical length of the compartment, $q$, when it is allowed to flow outward through the skim-milk passage, $j'$, carrying with it a percentage of cream, into the next outer compartment, $q'$. Here the fluid takes another course vertically, in a return direction, toward another skim-milk passage or duct, $i'$, at the top of said compartment and the cream therein, under increased centrifugal pressure, flows inward, into the cream-grooves, $q^3$, and over the inclined bottoms thereof to the inwardly extending cream passages, $k'$, which lead the cream close to the cream wall of the innermost compartment. The skim milk, passing outward through the passage $i'$, into the outermost compartment, $q^2$, contains only the small cream globules or particles which are hard to separate. The compartment, $q^2$, is made of narrow width so that the body of fluid is comparatively thin, though the chamber, being near the periphery of the bowl, is of ample capacity. At this position, the centrifugal force is the greatest and the conditions are thus good for a perfect separation of the remaining cream. The fluid here takes a final course vertically, the cream enters the cream grooves of the partition, $i$, and, following down the inclined bottoms of said grooves enters the cream ducts or passages, $k^2$, and is lead to the cream wall in the innermost chamber $q$, directly, the small globules thus not being compelled to flow against a large outflowing body of skim milk as is common in other machines. The skim milk finally passes from the machine, through the skim milk duct, $j^2$, in the bowl, to any suitable receptacle.

I am aware that many changes may be made in construction of the machine without departing from the spirit and scope of the invention, and so I do not wish to be limited to positive descriptions excepting as the state of the art may require.

Having thus described the invention, what I claim as new is—

1. In a centrifugal creamer, the combination with a bowl, of partitions $i$ and $j$ having inwardly extending corrugations inclined at their sides, the grooves of one partition being deeper at their upper ends and those of the other being deeper at their lower ends, substantially as set forth.

2. In a centrifugal creamer, the combination with the bowl, of an approximately vertical and annular partition dividing the main separating chamber into inner and outer compartments and having corrugations which are inclined and provided with perforations or ducts at their bottoms, substantially as set forth.

In testimony that I claim the foregoing I have hereunto set my hand this 12th day of June, 1893.

OLOF OHLSSON.

Witnesses:
CHARLES H. PELL,
OLIVER DRAKE.